United States Patent Office 3,769,405
Patented Oct. 30, 1973

3,769,405
METHODS FOR OBTAINING DIURESIS
John Phillip Aldred, St. Anne, James Winslow Bastian, Park Forest, and Richard Raymond Kleszynski, Kankakee, Ill., assignors to Armour Pharmaceutical Company, Chicago, Ill.
No Drawing. Filed Apr. 17, 1970, Ser. No. 29,691
Int. Cl. A61k 27/00
U.S. Cl. 424—177                                    6 Claims

ABSTRACT OF THE DISCLOSURE

Method of obtaining diuresis of sodium and water from a host by the administration of fish ultimobranchial calcitonin to the host animal, including man, to obtain diuresis therein.

---

This invention relates generally to the treatment of hypertensive and edematous states in animals, including man; and more particularly to methods and preparations for obtaining diuresis, especially of sodium and water, to ameliorate those conditions which benefit from a reduction of body sodium and water, e.g., congestive heart failure, edema of renal or hepatic origin, high blood pressure and the like.

By way of background, the use of diuretic agents in the treatment of conditions requiring an increase in electrolyte and water excretion is known and several effective agents are available.

One problem which arises with most of such agents is that while they are obtaining a reduction in body sodium, they are also liable to obtain an excessive reduction in body potassium, which is not desired. Thus, the ideal naturetic should provide a high ratio of excreted sodium to excreted potassium. When an agent produces diuresis with a low ratio of sodium to potassium excretion, considerable care must be used in administering such an agent to prevent the deleterious effects associated with hypokalemia.

The increase of sodium excretion is, of course, essential in the treatment of conditions, such as those indicated above where reduced body water retention is strategic to treatment of the diagnosed malady. Excessive treatment, because of overdosage, or the continuation of treatment beyond that optimal for the condition can, using conventional diuretic agents, lead to the production of a state of electrolyte imbalance which could have fatal consequences.

Further, the accidental administration of excessive doses of conventional diuretic drugs is potentially fatal.

The present invention is predicated upon the discovery that preparations containing calcitonin from the ultimobranchial bodies of fish, especially salmon, which is obtained by suitable extraction and purification procedures, such as are described by Guttmann et al. (see: Helvetica Chemica Acta, vol. 52, p. 1789, 1969), are surprisingly effective as diuretic agents to obtain excellent values of water and sodium diuresis while providing a high ratio of excreted sodium to excreted potassium together with an unusually low tendency to cause excessive electrolyte depletion and consequent electrolyte imbalance. Furthermore, the fish calcitonin provides an exceedingly high safety ratio in terms of effective dose vs. lethal dose, the acute lethal dose of fish ultimobranchial calcitonin being so high that attempts to establish it have thus far been unsuccessful.

By virtue of its superior effect, fish ultimobranchial calcitonin thus provides highly effective and unusually safe therapeusis for the amelioration of hypertension and edema states such as congestive heart failure and edemas of kidney and liver origin.

Further unexpected attributes of fish ultimobranchial calcitonin, the mechanisms of which are not fully understood, involve its self-limiting action whereby it rapidly and efficiently brings about the excretion of excess sodium and water and thereafter allows sodium excretion levels to return to substantially normal levels; its ability to obtain a high ratio of excreted sodium to excreted potassium; and its exceedingly high safety index compared to conventional diuretic agents, in terms of the ratio of the acute lethal dose to the effective dose.

Among other diuretics currently available are furosemide (4-chloro-N-furfuryl-5-sulfamoylanthranilic acid) and ethacrynic acid ([2,3-dichloro - 4 - (2-methylenebutyryl)-phenoxy]acetic acid).

Furosemide, while successful as a diuretic, carries ominous federally imposed warnings because of its propensity to electrolyte depletion. (See: 1970 edition, Physician's Desk Reference, page 742.) Ethacrynic acid is another successful diuretic but is also subject to federal warnings with respect to electrolyte depletion and its use requires frequent serum electrolyte, $CO_2$ and BUN determinations.

It thus becomes apparent that a great need exists for preparations and methods of obtaining the diuresis of sodium while avoiding excessive electrolyte depletion or imbalance. There is a further need for a diuretic which is capable of obtaining a high ratio of excreted sodium to potassium while effectively reducing the content of body water and body sodium.

Accordingly, it is a prime object of the present invention to provide improved methods and preparations for obtaining diuresis in animals, including man, which obtains effective diuretic action relative to sodium and water while avoiding the deleterious enhancement of the excretion of other body electrolyte components, especially potassium.

Another object of the present invention is to provide methods and preparations for obtaining diuresis in animals, including man, which obtains effective diuresis of sodium and water and provides an exceedingly high ratio of acute toxic dose level to effective dose level (that is, a high safety index).

Still a further object of the present invention is to provide a pharmaceutical preparation useful in obtaining diuretic relief containing as its principal active ingredient calcitonin derived from the ultimobranchial bodies of fish, especially salmon.

These and still further objects as shall hereinafter appear are remarkably fulfilled by the present invention in a totally unobvious manner as will be readily discerned from the following detailed description of exemplary embodiments thereof.

"Salmon calcitonin" as used herein to exemplify fish ultimobranchial calcitonin, defines those peptides with calcitonin activity which can be extracted from the ultimobranchial bodies of salmon. The chemical structure of one of these active peptides is as follows:

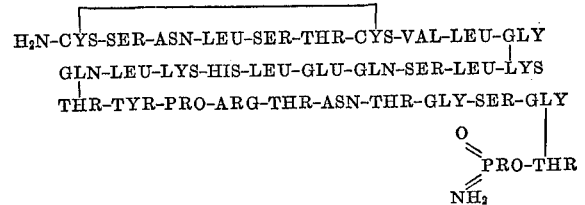

The preparation of calcitonin from the ultimobranchial bodies of fish can be accomplished in a number of ways. For instance, using the procedure of Hirsch et al. (see: Science, 146, p. 412, 1969) as modified by Copp et al., (see: Proceedings, Third Parathyroid Conference, vol. 3, p. 24, 1968, Academic Press), frozen ultimobranchial glands are dried and defatted with acetone and thereafter subjected to acid extraction to form a calcitonin-containing extract.

Alternatively, fresh ultimobranchial tissue is homogenized with 10 mls. of 0.1 N HCl/gm. tissue for 30 seconds to one minute in a Waring Blender at 0° C. This mixture is allowed to stand for one hour and thereafter centrifuged at 4500 r.p.m.'s to remove all particulate matter therefrom.

A nine- to ten-fold purification of the extract may be obtained by centrifugation at 100,000 g. for 24 hours in the No. 40 rotor of a Spinco Preparative Ultracentrifuge.

Regardless of the duration of centrifugation, the supernatant is then lyophilized to form a powder.

Next, the lyophilized powder is taken up in a small volume of 0.1 N formic acid (1 ml. per./mg.) and trichloroacetic acid is added until it constitutes about 12% of the total volume. The mixture is allowed to stand for about 12 hours at 5° C. and the resulting precipitate is collected by centrifugation, re-suspended in 10% acetic acid, and treated with IRA 400 (14–30 mesh) in the acetate form to remove all traces of trichloroacetic acid therefrom. The clear solution is then diluted with water and lyophilized to provide powdered fish ultimobranchial calcitonin.

Further purification may be obtained, if desired, by sequential fractionation of a calcitonin solution on Sephadex G–50 followed by carboxymethyl Sephadex G–25.

Another method of preparing calcitonin for use in the present invention comprises using frozen ultimobranchial bodies which have been dried and defeated with acetone. The solvent of Gudmundsson et al., a 75:7.5:21 mixture of butanol, acetic acid and water is then added to the dried bodies in the ratio of 15 mls. of solvent per gram of dry tissue. (See Gudmundsson et al. "The Purification of Thyrocalcitonin," Calcitonin: Symposium on Thyrocalcitonin and C Cells, July 1967. S. F. Taylor, editor; Heinemann Medical Books Ltd., London, p. 51, 1968.)

The mixture of tissue and solvent is allowed to stand at 20° C. for 8 hours and the supernatant is removed therefrom after centrifugation. Two further treatments with solvent, one for 4 hours and the other for 30 minutes, are also given and each supernatant is collected after centrifugation. The total volume of the pooled supernatants is measured and the solution cooled to −20° C. Precooled acetone (5 vols. per vol. supernatant) is then added and the calcitonin allowed to precipitate for a period of 3 days at −20° C. The precipitate is then collected by centrifugation and all residual acetone, if any, is driven off in a current of warm air. The remaining dry precipitate comprises fish ultimobranchial calcitonin and is ready for formultion into a pharmaceutical dosage form.

Fish ultimobranchial calcitonin, prepared by any of the foregoing procedures is then formulated into useful pharmaceutical preparations preferably of unit dosage form.

Among the several dosage forms found useful for the therapeutic administration of salmon calcitonin are: liquids, for oral inhalation, itravenous, intramuscular and subcutaneous administration; tablets and powders for buccal and intranasal administration; oils, creams and ointments for percutaneous administration; and suppositories, for vaginal and anal administration. It has been found that parenteral and pancaval, i.e., administration through those body orifices through which systemic absorption is obtained, and percutaneous are highly satisfactory routes of the administration.

In a preferred practice of the present invention, unit doses containing from about 0.1 to about 50 micrograms of ultimobranchial calcitonin or its synthetic counterpart per kilogram of body weight of the intended host is preferred. Suitable formulations are hereinafter described. Amounts described herein are based on a substantially pure calcitonin product having a potency of 3500 M.R.C. units per milligrams and it is within the skill of the art to determine the equivalent dosage when calcitonin of lower potency is employed.

The method of treatment embodying the present invention comprises administering, upon one or more occasions and at appropriate intervals, to the selected host, i.e., the animal, including man, in need of diuretic therapy, a suitable amount, that is, the equivalent of from about 0.1 to about 50 micrograms per kilogram of host body weight, of fish ultimobranchial calcitonin or its synthetic counterpart (potency of 3500 M.R.C. units per mg.) in a suitable pharmaceutically acceptable excipient such as sterile water, aqueous glucose solution, propylene glycol, polyethylene glycol, aqueous gelatin, corn oil, isotonic saline, ethyl alcohol solution, calcium carbonate, cocoa butter, petrolatum, Freon-type compounds and the like, which has been selected giving conventional consideration as to whether parenteral, pancaval or percutaneous administration is to be employed.

Therapeusis obtained in accordance herewith comprises the diuresis of sodium and water without excessive potassium depletion.

To further aid in the understanding of the present invention, but not by way of limitation, the following examples are presented:

EXAMPLE I

Fish ultimobranchial calcitonin is prepared by homogenizing ultimobranchial bodies, which have been surgically removed from the heads of salmon with 10 ml. HCl (0.1 N) solution per gm. tissue in a blender at 0° C. and thereafter settling and centrifuging to remove particulate matter therefrom. Additional purification can be obtained by additional centrifugation at high speed.

The residue is discarded then the supernatant is clarified and lyophilized to form a powder. The powder is taken up in 1 ml./per mg. of formic acid (0.1 N) and trichloroacetic acid is added until it constitutes 12% of the total volume. The mixture is allowed to stand and the resulting precipitate is collected, as by centrifugation, resuspended in 10% acetic acid, and treated with an anionic ion exchanger, such as IRA 400 in the acetate form, to remove the trichloroacetic acid therefrom. The clear solution is then diluted with clear water and lyophilized to provide powdered fish ultimobranchial calcitonin.

Further, purification may be obtained by the sequential fractionation of a calcitonin solution on Sephadex G–50 followed by carboxymethyl Sephadex G–25.

EXAMPLE II

Salmon calcitonin prepared from salmon ultimobranchial tissue by the procedure of Example I and having an activity of 1500 M.R.C. units* per mg. solids was examined to determine its effect on serum and urine electrolytes over a 1–5 hour period as follows:

Male Holtzman rats weighing 220–250 grams were fasted overnight and placed in metabolism cages, 2–3 rats per cage.

Each rat was injected with a dose of calcitonin, as indicated in the tables and, simultaneously, with an intraperitoneal load of 0.9% saline (3.3 cc. per 100-gram body weight). Neither food nor water was allowed during the experiment.

Table I below shows the effects of single subcutaneous injections of 0.2 and 2 M.R.C. units per 100 grams animal body weight, of salmon calcitonin on urine sodium and potassium excretion in rats during a five hour collection period. As shown, 2.0 M.R.C. units per 100 gm. (but not 0.2 unit/100 gm.), elevated urine volume three-fold and total urinary sodium by 3.5-fold without influencing potassium excretion which resulted in a significant elevation of the sodium:potassium ratio.

*M.R.C. units are determined by measuring the lowering of serum calcium 1 hour after administration to rats of the test preparation compared to Standard B of the Medical Research Council (M.R.C.), London.

TABLE I.—EFFECTS OF SALMON CALCITONIN ON URINE ELECTROLYTES IN THE SALINE-LOADED RAT

| Group | Calcitonin dose (U/100 g.) | Urine vol. (cc.)[a] | Total Na (mg.)[a] | Total K (mg.)[a] | Na:K ratio |
|---|---|---|---|---|---|
| Control | 0 | 2.2±0.3 | 9.3±1.1 | 5.6±1.2 | 1.73±.26 |
| I-A | 0.2 | 2.2±0.8 | 10.9±3.1 | 7.0±1.0 | 1.53±.28 |
| I-B | 2.0 | [b]6.7±1.6 | [c]34.0±5.4 | 4.9±0.3 | [c]6.92±1.19 |

[a] Per rat. [b] P<.01. [c] P<.001.
NOTE.—N=4 replicates of 2 rats/group.

EXAMPLE III

Using the protocol of the 5-hour saline-loaded rat assay described in Example II, graded doses of salmon calcitonin were administered and the effect on urine electrolytes was measured. Doses of 0.5 to 2.0 M.R.C. units ("U") per 100 grams animal body weight produced dose-related increases in urine volume and sodium excretion and significant elevations of the sodium-potassium ratios. The results are reported in Table II, as follows:

EXAMPLE V

The protocol of Example II was repeated to treat groups of rats with 2 M.R.C. units/100 g. of calcitonin extracted from salmon. The calcitonin was disposed in 16% gelatin vehicle and saline loading was omitted.

Urine samples were collected from the separate groups at the end of 1, 3 and 5 hours post-treatment. Each group consisted of four cages containing three rats each. The urine data is reported below in Table IV.

At 5 hours post-treatment, blood samples were drawn from the abdominal aorta and the animals sacrificed.

Salmon calcitonin caused no significant changes in any of the urine parameters measured during the first hour following treatment. In the 3-hour group, calcitonin caused a doubling of urine volume and a 3-fold increase in urine sodium excretion, no significant change in potas- TABLE II.—EFFECTS OF GRADED DOSES OF SALMON CALCITONIN ON URINE ELECTROLYTES IN THE SALINE-LOADED RAT

| Group | Calcitonin dose (U/100 g.) | Urine vol (cc.) | Total Na (mg.)[a] | Total K (mg.)[a] | Na/K | Total Ca (mg.)[a] |
|---|---|---|---|---|---|---|
| Control | 0 | 2.0±0.4 | 9.9±2.5 | 4.2±1.3 | 2.35±.21 | .05±.02 |
| II-A | 0.2 | 2.1±0.2 | 9.0±1.1 | 5.2±0.5 | [c]1.71±.10 | .04±.01 |
| II-B | 0.5 | [c]4.0±0.6 | [c]17.3±2.1 | [b]6.0±0.4 | 2.88±.50 | .06±.01 |
| II-C | 1.0 | [b]4.4±1.2 | [c]24.0±4.5 | 4.4±0.9 | [b]5.77±2.11 | .06±.01 |
| II-D | 2.0 | [c]6.8±0.9 | [d]35.5±4.6 | 4.8±0.6 | [c]7.49±1.22 | [b].09±.01 |
| II-E | 4.0 | [c]5.5±0.7 | [d]33.9±1.9 | 4.7±0.8 | [d]7.28±.78 | [b].09±.02 |

[a] Per rat. [b] P<.05. [c] P<.01. [d] P<.001.
NOTE.—N=3 replicates of 2 rats/group, except doses of 0.5 and 1.0 U/100 g., which contained 4 replicates of 2 rats/group.

EXAMPLE IV

The protocol of Example II was repeated to compare the effect of ultimobranchial calcitonin obtained from salmon with the effect of synthetic calcitonin on urine electrolyte excretion. As will be observed from Table III below, significant elevations in urine volume, sodium, potassium and calcium were obtained with both salmon preparations.

sium excretion, and an elevation of the sodium:potassium ratio (see: Table IV).

Calcitonin treatment produced hypocalcemia and hypophosphatemia at 1, 3 and 5 hours post-treatment (Table V). Serum magnesium was elevated 1 hour after treatment, but no significant effects were observed on this parameter at later time intervals. Serum potassium was slightly but significantly increased 5 hours post-treatment.

TABLE III.—EFFECTS OF NATURAL AND SYNTHETIC SALMON CALCITONIN ON URINE ELECTROLYTES IN THE SALINE-LOADED RAT

| Group | Calcitonin dose (U/100 g.) | Urine vol (cc.)[a] | Total Na (mg.)[a] | Total K (mg.)[a] | Na/K | Total Ca (mg.)[a] |
|---|---|---|---|---|---|---|
| Control | 0 | 1.5±0.3 | 6.1±1.0 | 2.9±0.4 | 2.12±.28 | .03±.01 |
| III-A | [b]0.5 | [f]3.5±0.6 | [e]17.8±5.0 | [e]5.3±1.4 | [f]3.33±.18 | [d].045±.01 |
| III-B | [b]2.0 | [f]5.0±0.2 | [f]26.6±2.4 | [d]3.8±0.4 | [f]7.11±1.1 | [f].06±.01 |
| III-C | [c]0.5 | [e]2.4±0.3 | [f]12.1±1.1 | [e]54.±1.0 | 2.29±.41 | .035±.01 |
| III-D | [c]2.0 | [f]4.5±0.2 | [f]25.6±1.2 | [e]4.7±0.8 | [e]5.58±1.3 | [f].06±.01 |

[a] Per rat.
[b] Salmon calcitonin; natural source.
[c] Salmon calcitonin; synthetic source.
[d] P<.05.
[e] P<.01.
[f] P<.001.

No significant changes in hematocrit were observed (see: Table V).

TABLE IV.—EFFECTS OF SALMON CALCITONIN (DOSE OF 2 U/100 G.) ON SELECTED URINE ELECTROLYTES IN THE NON-SALINE-LOADED RAT

| | 1 hour | | 3 hours | | 5 hours | |
|---|---|---|---|---|---|---|
| | Control | CT | Control | CT | Control | CT |
| Urine volume (cc.)[a] | 0.5±0.2 | 0.4±0.2 | 0.6±0.1 | [d]1.1±0.1 | 0.6±0.1 | [c]2.1±0.6 |
| Total Na (mg.)[a] | 1.6±1.0 | 1.9±0.5 | 2.5±1.5 | [d]7.9±0.4 | 1.9±0.3 | [d]13.8±2.7 |
| Total K (mg.)[a] | 4.8±3.1 | 4.2±2.0 | 5.1±3.8 | 7.5±3.5 | 2.4±0.4 | [c]3.9±0.7 |
| Na/K | 0.33±.02 | 0.50±.15 | 0.55±.11 | [b]1.22±.47 | 0.8±.18 | [c]3.6±1.0 |

[a] Per rat. [b] P<.05. [c] P<.01. [d] P<.001.
NOTE.—N=4 replicates of 3 rats/cage; CT=Fish ultimobranchial calcitonin.

TABLE V.—EFFECTS OF NATURAL SALMON CALCITONIN ON BLOOD ELECTROLYTES IN THE NON-SALINE-LOADED RAT

| | 1 hour | | 3 hours | | 5 hours | |
|---|---|---|---|---|---|---|
| | Control | CT | Control | CT | Control | CT |
| Na (mg. percent) | 387±32 | 382±48 | 374±28 | 354±31 | 334±30 | 361±19 |
| K (mg. percent) | 31.7±4.2 | 27.7±4.4 | 28.7±3.2 | 27.5±2.8 | 26.4±4.1 | [a]30.0±2.4 |
| Ca (mg. percent) | 8.82±.31 | [b]7.52±.27 | 9.05±.43 | [b]6.45±.32 | 9.46±.58 | [b]6.12±.57 |
| Mg (mg. percent) | 2.39±.12 | [b]2.63±.09 | 2.45±.34 | 2.65±.17 | 2.27±.15 | 2.31±.18 |
| P (mg. percent) | 9.12±.74 | [b]7.13±.69 | 9.68±.84 | [b]6.49±.59 | 9.86±.62 | [b]6.35±.77 |
| pH | 7.92±.07 | 7.88±.07 | 7.90±.06 | 7.90±.06 | 7.92±.06 | 7.96±.06 |
| Hematocrit (percent) | 43.6±1.8 | 44.6±1.4 | 46.9±1.7 | 47.2±2.3 | 48.8±2.3 | 48.8±1.2 |

[a] P<.05. [b] P<.001.
NOTE.—N=4 replicates of 3 rats/cage. Dosage: 2 U/100 g. CT=Fish ultimobranchial calcitonin.

EXAMPLE VI

Salmon calcitonin, extracted from heads obtained from a commercial fish processor, was administered intramuscularly to dogs in a 16% gelatin vehicle. The effect of the administration on urine electrolyte excretion was determined by collecting urine for 24 hours after injection. The control reported is the mean of three consecutive 24-hour urine collections prior to treatment day. The results are set forth in Table VI below:

TABLE VI.—EFFECTS OF SALMON CALCITONIN ON 24-HOUR URINE ELECTROLYTE EXCRETION IN THE DOG

| Group | Dose (U/kg.) | Urine vol. (cc.) | Total Na (mg.) | Total K (mg.) | Na/K | Total Ca (mg.) |
|---|---|---|---|---|---|---|
| Control | | 175 | 774 | 1053 | 0.74 | 8.3 |
| VI-A | 5 | 87 | 779 | 634 | 1.23 | 2.8 |
| Control | | 263 | 777 | 1,065 | 0.73 | 7.0 |
| VI-B | 10 | 415 | 1,448 | 1,147 | 1.26 | 7.1 |
| Control | | 255 | 786 | 1,082 | 0.73 | 8.2 |
| VI-C | 20 | 195 | 1,225 | 960 | 1.28 | 8.6 |

EXAMPLE VII

Salmon calcitonin, administered to a human patient who recorded a sodium/creatinine ratio of 80–90 during a control period, raised the sodium/creatinine ratio to 140–150 during initial infusion which ratio returned to control level after seven hours even though infusion continued.

EXAMPLE VIII

The protocol of Example II was repeated for salmon calcitonin and two recognized diuretic drugs, viz, hydrochlorthiazide and furosemide. The results, reported in Table VII, show salmon calcitonin to provide diuresis of urine and sodium comparable to accepted diuretics while obtaining substantially greater sodium/potassium ratios. The profile obtained substantiates the protocol as an effective measure of human efficacy and confirms the superiority of salmon calcitonin to the recognized drugs in terms of sodium:potassium ratio.

TABLE VII.—FIVE HOUR URINE COLLECTIONS FOLLOWING SINGLE DOSE ADMINISTRATION IN SALINE-LOADED, FASTED RATS

| | Route | Dose (mg./kg.) | Urine volume (mls.) | Total sodium (mgs.) | Total potassium (mgs.) | Ratio, sodium/potassium |
|---|---|---|---|---|---|---|
| Hydrochlorthiazide | P.o. | 3.16 | [1]12.9 | [1]47.8 | [2]12.1 | [3]4.2 |
| Do | P.o. | 1.00 | [1]11.0 | [1]44.2 | [3]12.8 | [2]3.5 |
| Do | P.o. | 0.316 | [1]9.2 | [1]33.5 | [3]9.4 | [2]2.6 |
| Do | P.o. | Control | 4.6 | 15.3 | 6.3 | 2.5 |
| Do | P.o. | 0.5 | [1]13.4 | [1]38.3 | 14.6 | [2]2.7 |
| Do | P.o. | 0.1 | [1]11.8 | [1]29.6 | 12.0 | [2]2.6 |
| Do | P.o. | 0.05 | 8.7 | [1]21.0 | 9.7 | 2.4 |
| Do | P.o. | Control | 7.2 | 12.0 | 8.6 | 1.4 |
| Furosemide | P.o. | 100 | [1]37.2 | [1]101.9 | [1]36.1 | [1]2.8 |
| Do | P.o. | 31.6 | [1]33.7 | [1]89.8 | [1]29.1 | [1]3.1 |
| Do | P.o. | 10.0 | [3]13.3 | [3]34.0 | [2]15.7 | 2.2 |
| Do | P.o. | Control | 7.0 | 17.5 | 12.0 | 1.5 |
| Do | P.o. | 10.0 | [2]10.3 | [1]26.8 | [3]12.9 | [2]2.1 |
| Do | P.o. | 3.16 | 8.6 | [2]18.1 | 9.6 | [2]1.9 |
| Do | P.o. | 1.0 | 6.7 | 11.9 | 7.2 | 1.7 |
| Do | P.o. | Control | 7.2 | 12.0 | 8.6 | 1.4 |
| Salmon calcitonin | S.c. | .0132 | [1]11.0 | [1]67.9 | 9.4 | [1]7.3 |
| Do | S.c. | .0066 | [2]13.5 | [1]71.0 | 9.6 | [2]7.5 |
| Do | S.c. | .0033 | [2]8.8 | [2]98.1 | 8.8 | [2]5.8 |
| Do | S.c. | .0017 | [2]8.1 | [2]34.6 | [2]12.1 | 2.9 |
| Do | S.c. | .0006 | 4.2 | 18.0 | 10.5 | [2]1.7 |
| Do | S.c. | Control | 4.1 | 19.8 | 8.5 | 2.4 |

[1] $P<.001$
[2] $P<.05$
[3] $P<.01$
Treated group vs. simultaneous control group.

EXAMPLE IX

Various pharmaceutical preparations containing fish ultimobranchial calcitonin, either synthetic or that obtained from natural sources, are suitable to practice the therapeutic method of this invention. Typical formulations, and the route of administration for which they are best suited, are shown below.

COMPOSITION A

Sterile salmon ultimobranchial calcitonin solution is lyophilized in the presence of mannitol to provide a preparation which, when reconstituted, may be administered by intramuscular and subcutaneous routes. The sterile reconstitution of the lyophilized cake is obtained by dilution, q.s. with a suitable vehicle, such as:

(a) 16% aqueous gelatin containing 0.5% phenol;
(b) 1–4% polyethylene glycol 4000, 0.9% sodium chloride and sterile water;
(c) 10–40% propylene glycol and sterile water;
(d) sterile 5% glucose solution;
(e) sterile 0.9% sodium chloride; and
(f) sterile water.

COMPOSITION B

For intravnous administration, a solution is prepared by dissolving fish ultimobranchial calcitonin (1–1000 micrograms/cc.) in sterile 5% glucose or 0.9% saline. The rate of infusion is adjusted to provide the host with a desired dosage level.

COMPOSITION C

A preparation, suitable for oral inhalation with conventional nebulizers is prepared as a solution containing fish ultimobranchial calcitonin (100–1000 micrograms/cc.) and sodium chloride, sodium citrate, glycerin, chlorobutanol and sodium bisulfite. The preparation is administered by hand bulb nebulization in a dosage of about 0.1 cc. per inhalation.

The preparation, alternatively, may be administered by use of a nebulizing unit containing 20 cc. calcitonin (200–2000 micrograms/cc.), inert propellants (dichlorodifluoromethane and dichlorotetrafluorethane), alcohol 33% and ascorbic acid 0.1% which will deliver about 300 single oral inhalations (10–100 micrograms/dose).

COMPOSITION D

A solution for use as an intranasal spray or drops is prepared to contain, per cc., 10–1000 micrograms of fish ultimobranchial calcitonin, exsiccated sodium phosphate, citric acid, sodium chloride, glycerin, sorbitol solution, methyl paraben, propylparaben, chlorobutanol (max. .05%) and sterile water.

COMPOSITION E

Sublingual glossets containing 10–1000 micrograms of calcitonin per glosset, were prepared in a rapidly disintegrating base of starch, lactose, sodium saccharin, talcum and sodium bisulfite. Glossets of 10 and 20 mg. size were satisfactory.

COMPOSITION F

A topical cream was prepared by dispensing fish ultimobranchial calcitonin in a cream vehicle consisting of a water-washable aqueous base of stearic acid, propylene glycol, sorbitan monostearate and monooleate, polyoxyethylene sorbitan monostearate. Citric acid, methylparaben and propylparaben are used as preservatives. The concentration of calcitonin is 10–1000 micrograms per gram of vehicle.

Alternatively, calcitonin may be dispensed in corn oil, sesame oil, cottonseed oil or polyethylene glycols with the addition of appropriate preservatives and is useful for topical application.

COMPOSITION G

A suppository containing fish ultimobranchial calcitonin (10–1000 micrograms) is prepared by disposing the calcitonin in a base of lactose, polyethylene glycol 400, polysorbate 80, polyethylene glycol 4000 and glycerin, buffered with lactic acid to about pH 4.5. The suppository is useful for either anal or vaginal application.

From the foregoing, it is apparent that new and novel methods and preparatons for obtaining diuresis in animals, including man, have been herein described and illustrated which fulfill all of the aforestated objectives in a remarkably unobvious fashion. It is, of course, understood that such modifications, alterations and adaptations that may readily occur to the artisan confronted with this disclosure are intended within the spirit of this invention, especially as it is defined by the scope of the claims appended hereto.

Accordingly, what is claimed is:

1. The method of obtaining diuresis of sodium and water in a host which requires therapeutic sodium depletion comprising administering to said host an effective amount of fish ultimobranchial calcitonin selected from the group consisting of natural and synthetic fish ultimobranchial calcitonin sufficient to produce a high ratio of excreted sodium to excreted potassium.
2. The method of claim 1 in which said ultimobranchial calcitonin is administered by parenteral route.
3. The method of claim 1 in which said ultimobranchial calcitonin is administered by pancaval route.
4. The method of claim 1 in which said ultimobranchial calcitonin is administered by parenteral route.
5. The method of claim 1 in which said fish ultimobranchial calcitonin is derived from salmon.
6. The method of claim 1 in which said fish ultimobranchial calcitonin is of synthetic origin.

References Cited

FOREIGN PATENTS 1,216,865   12/1970   Great Britain _____ 260—112.5

OTHER REFERENCES

O'Dor: Canadian Journal of Biochemistry, vol. 47 (1969), pp. 823–825.

Copp: Advances in Internal Medicine, vol. 14 (1968), pp. 55, 64.

Gabriel et al. Chem. Abst., vol. 70 (1969), p. 74843 U (abst. of 1968 article).

Milhaud et al.: Chem. Abst., vol. 71 (1969), p. 27749d.

Taylor et al.: Calcitonin, 1969, Proc., 2nd. Int. Symp. (1969), p. 291.

SAM ROSEN, Primary Examiner